April 10, 1928.  H. E. TAYLOR  1,665,483
TRANSPORTATION SYSTEM
Filed Dec. 13, 1926   4 Sheets-Sheet 2
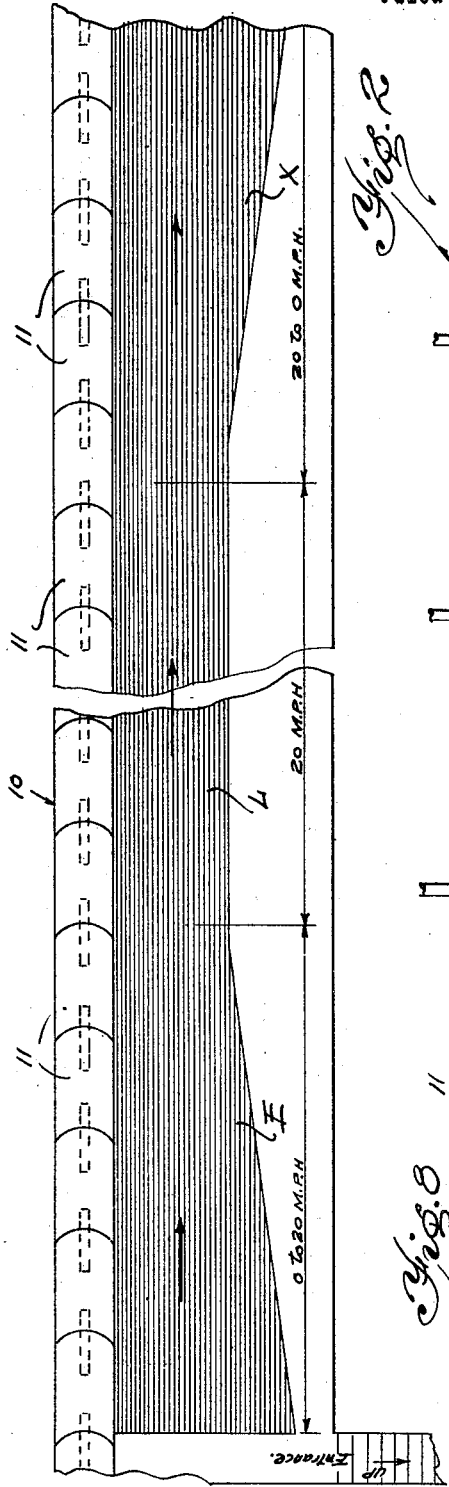
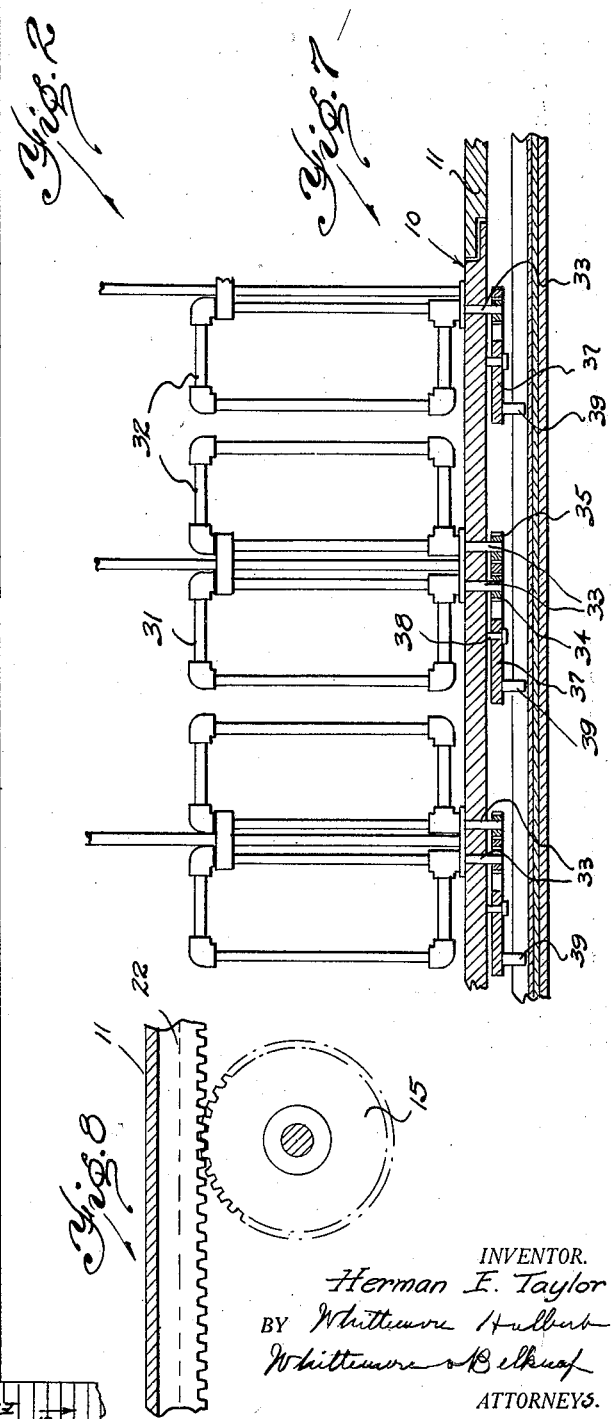
INVENTOR.
Herman E. Taylor
BY Whittemore Hulbert
Whittemore & Belknap
ATTORNEYS.

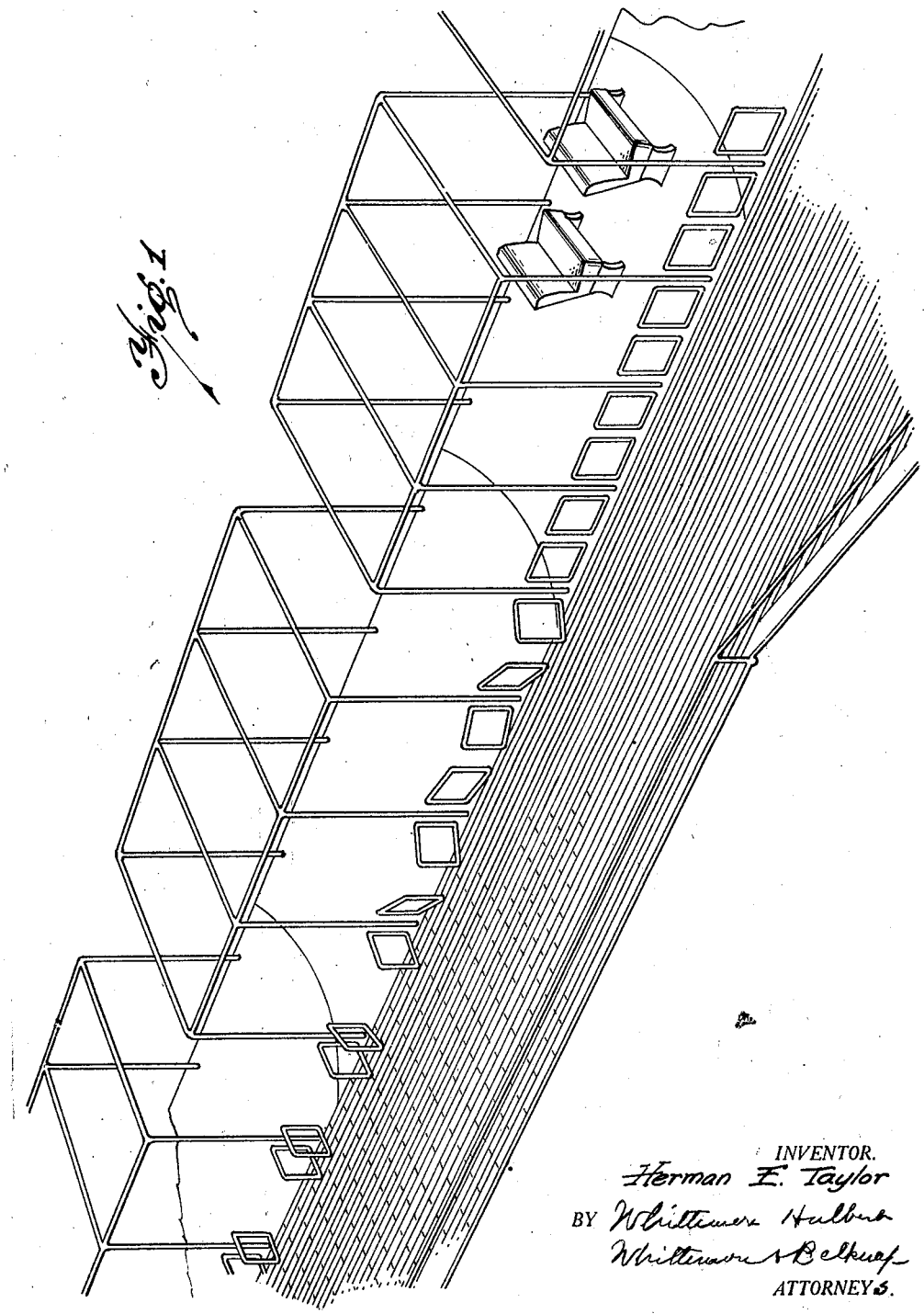

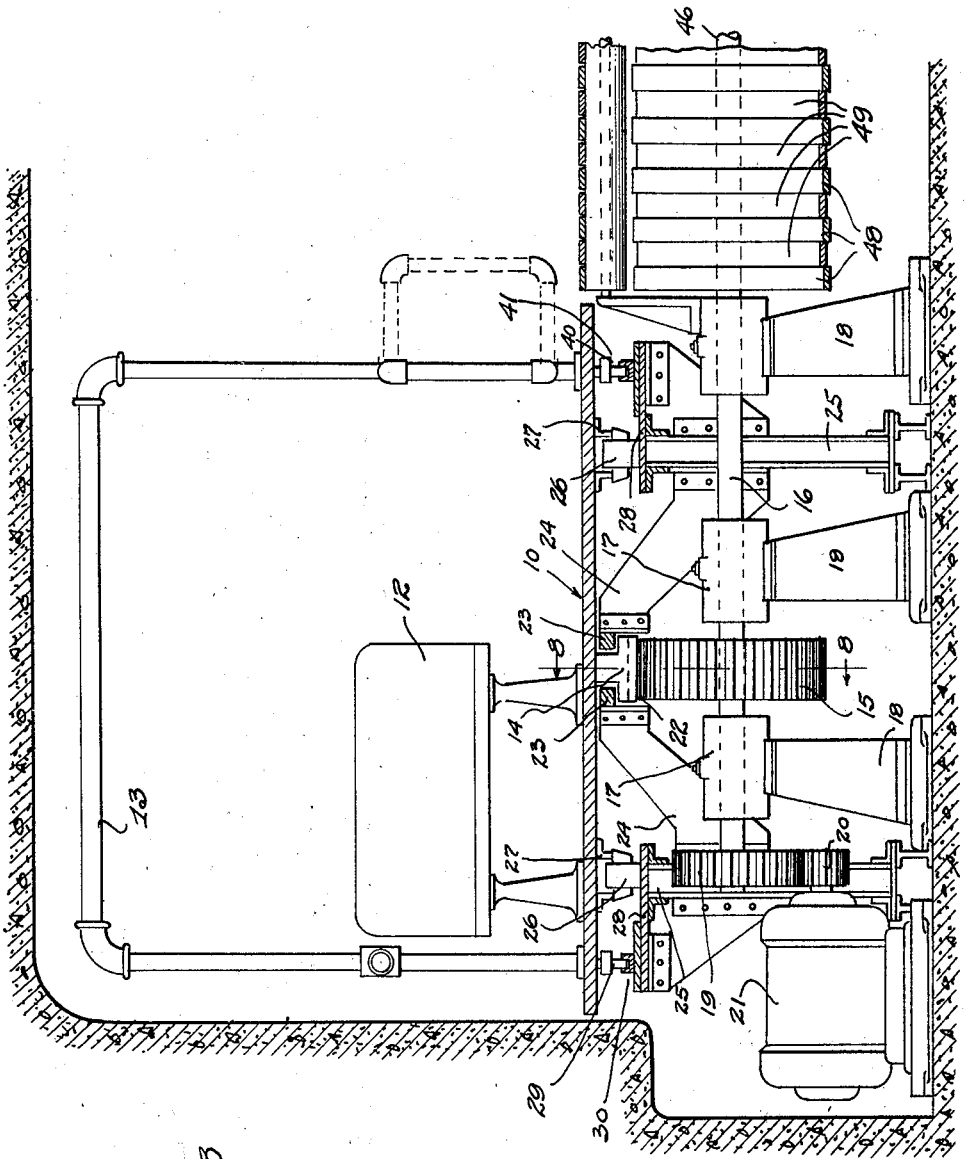

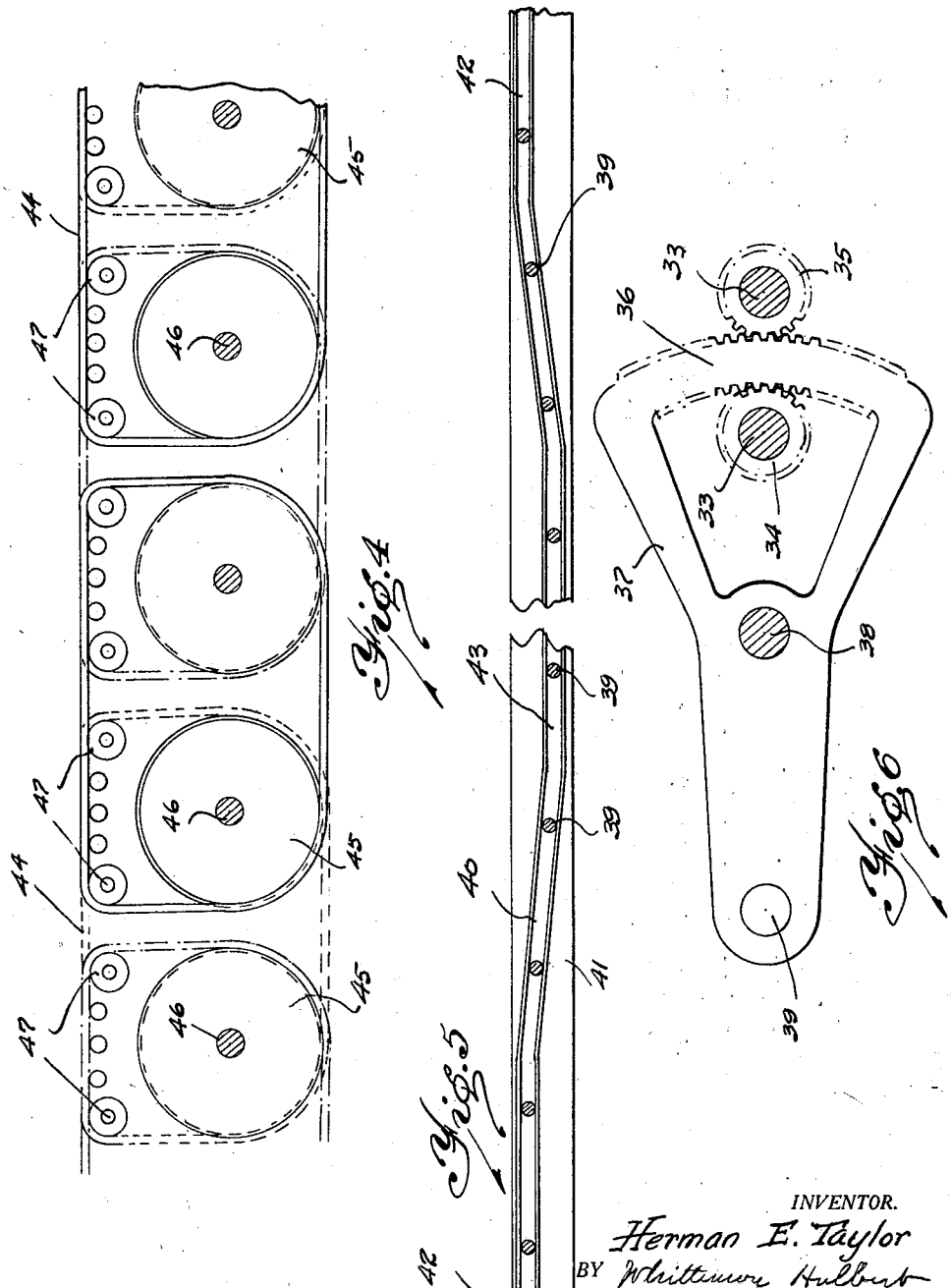

Patented Apr. 10, 1928.

1,665,483

UNITED STATES PATENT OFFICE.

HERMAN E. TAYLOR, OF DETROIT, MICHIGAN.

TRANSPORTATION SYSTEM.

Application filed December 13, 1926. Serial No. 154,559.

This invention relates to transportation systems of the general character illustrated in my United States Patent No. 1,632,569, dated June 14, 1927.

Transportation systems of this character contemplate the provision of a transporting conveyor or platform driven continuously at a constant speed and also contemplate the provision of a loading platform or platforms of such a construction and character and propelled and driven in such a manner as to facilitate the loading of passengers on to the transporting conveyor.

The improvements contemplated in the present application consist principally in the character and construction of the loading platform and the invention has as one of its primary objects to simplify, render more efficient and improve generally this loading platform. The herein described construction includes a plurality of endless belt-like elements arranged in substantially longitudinal alignment and mounted with the upper flights thereof in substantially the same horizontal plane to provide a passenger receiving platform. It is also proposed to drive these belt-like elements each at a constant speed with the speed of successive elements progressively increasing from the entrance end to the loading portion thereof and successively decreasing from the loading portion to the exit portion of the platform so that passengers may step upon this platform and be conveyed without effort to the loading point adjacent the conveyor platform at which point the speed of the conveyor platform and of the loading platform is substantially the same. As a consequence the passengers are enabled to pass from the loading to the conveying platform while passengers desiring to leave the transporting platform may step therefrom upon the loading platform and be conveyed to the exit end of the latter at a progressively decreasing rate of speed, which speed at the exit end has been so reduced as to facilitate stepping from the platform.

With the herein described invention a loading platform is provided, the component or complementary parts of which are all driven at constant speeds in the same manner as the main conveying platform so that the same power units may be employed for driving both of these platforms.

With the herein described construction a loading platform is provided which has transversely extending areas arranged in longitudinal succession with adjacent areas operating at successively increasing or successively decreasing speeds and with an extended intermediate area operating at a constant speed, substantially similar to the main conveyor, and constituting the loading area of the loading platform.

In addition to other important structural details and characteristics the invention involves improvements in the operating mechanism for the control gates whereupon these gates are automatically opened and closed at suitable points throughout the flight of the main conveyor by simple but effective mechanism.

The several features of the present invention as well as the objects and advantages of the same will be made more apparent as this description proceeds, especially when considered in connection with the accompanying drawings wherein Figure 1 is a semi-diagrammatical fragmentary perspective view of my improved transportation system adjacent one of the loading platforms.

Figure 2 is a fragmentary semi-diagrammatical plan view of the structure illustrated in Figure 1.

Figure 3 is an enlarged vertical sectional view through the structure.

Figure 4 is a fragmentary vertical sectional view through the loading platform.

Figure 5 is a fragmentary plan view of a portion of the gate operating mechanism.

Figure 6 is a detail sectional elevational view of the portion of the gate operating mechanism.

Figure 7 is a sectional elevational view illustrative of the gates and the operating mechanism therefor and Figure 8 is a detail sectional view taken substantially on the plane indicated by line 8—8 in Figure 3.

Referring now particularly to the drawings wherein like reference characters indicate like parts it will be noted that there is illustrated a main transporting or conveyor platform 10 which consists of a plurality of articulated platform sections 11, this platform being adapted to contain a plurality of seats 12 and if desired guard rails 13. It is proposed to drive the main conveyor platform at a constant relatively high speed and for this purpose the bottom thereof is provided with a rack 14 adapted to be engaged by one or more driving gears 15 arranged at suitable intervals throughout the system. Each driving gear, in the embodiment of the invention herein illustrated, is mounted upon a shaft 16 which extends transversely to the path of travel of the platform and is journaled in suitable bearings 17 carried by supports 18. One end of this shaft has fixed thereto a gear 19 which meshes with a pinion 20 carried on the shaft of a motor or power unit 21. Obviously the power unit 21 and the driving gear connection with the platform 10 may be duplicated at as many points throughout the system as may be deemed necessary or expedient.

Vertical displacement of the platform 10 may be prevented by providing the rack 14 with lateral extensions 22 which underlie stops 23 carried by brackets 24 secured to the supporting frame 25 of the apparatus. The platform is supported upon rollers 26 carried by brackets 27 on the under side of the platform sections 11 which rollers engage tracks 28 supported on the frame members 25. Lateral displacement of the platform may be conveniently prevented by the provision of pins or the like 29 which project downwardly from the platform and engage in guide bars 30 U-shaped in cross section.

Pairs of gates 31 and 32 are provided and are so arranged as to prevent entrance to and exit from the main conveyor except at the loading area of the loading platform. For this purpose each pair of gates 31 and 32 is provided with a depending portion or shaft 33 to which pinions 34 and 35 are respectively secured. Each pair of pinions 34 and 35 is adapted to mesh with an arcuate rack or toothed portion 36 of a gate operating lever 37 which is pivotally mounted as at 38 to the under side of the main conveyor platform. Each lever 37 is provided with a depending pin 39 which is designed to operate in a cam groove 40 of gate operating member 41. As seen more clearly from Figure 5 the member 41 will be provided with parallel or straight cam groove portions 42 which, adjacent the loading areas of the loading platforms are formed into offset portions 43. As a consequence of this the gate operating levers 37 will not be actuated except during that period of time at which they are traversing the loading area of the loading platform whereupon the pins 39 of each lever 37 by reason of its engagement with the cam slot 40 will cause an oscillation of its lever 37 to thus rotate pinions 34 and 35 through the rack portion 36. This will cause the gates 31 and 32 to be swung from closed to open position illustrated most clearly in Figure 1 whereupon the passengers may pass to and from the main conveyor.

Each loading platform consists essentially, see more particularly Figures 1 and 2, of a loading or intermediate area L, entrance area E and exit area X. The loading platform, see more particularly Figures 3 and 4, consists of a plurality of endless belt-like elements 44 each of which passes around a pair of spaced main drums 45 mounted on shafts 46 and around a series of idler rollers 47 arranged to support the top of the flight of the belt. Each of the drums 45 is provided with circumferential areas 48 of relatively large diameter alternating with areas 49 of relatively smaller diameter. Each of the belts 44 will extend either from one of the larger diameters 48 of one of the main drums 45 to a relatively smaller diameter 49 of the other main drum 45 or vice versa. In the first instance the shaft 46 of the second main drum will be driven at a relatively higher rate of speed and in the other instance cited the shaft 46 of the second drum will be driven at a relatively slower rate of speed. It will be understood that the belt-like elements 44 are relatively narrow in width and that a series of these belts are arranged side by side to constitute each transversely extending area of the loading platform and furthermore that these belt-like elements are arranged in substantially longitudinal alignment to form the longitudinal length of the loading platform. The longitudinal lines of belt-like elements 44 have the ends of adjacent belts arranged in overlapping relation so that the rear flight of the next forwardly arranged belt 44 is in engagement with the main drum 45 around which the forward flight of the next belt to the rear engages. As a consequence of this structure all of the belts constituting the loading platform, may for instance, be driven from the shaft 16 which carries the main driving pinion 15 for the conveyor platform, the shaft 46 of the first main drum 45 being connected to or constituting a continuation of this shaft 16. In this way a synchronism between the operation of the main conveyor platform and of the loading platform is attained without the employment of complicated gearing or other apparatus. While the belts 44, which constitute the entrance area E and exit area X of the loading platform, are in engagement with stepped drums so as to successively increase or successively decrease the speed of any cross sectional area, nevertheless, the drums 45 which support the belt-like elements constituting the loading area L are all of the same diameter so that this portion of the platform is driven at a constant speed. It is also proposed to have the speed of this portion of the platform substantially coincident with the speed of the main conveyor platform so that passengers may readily step from the loading platform on to the conveyor platform or vice versa without liability of injury.

While the loading platform has been shown and described as arranged in a substantially horizontal position from end to end it should, nevertheless, be understood that this platform may have portions thereof longitudinally inclined. For instance the entrance end may be inclined from the street level to the level of the conveyor platform and the exit end inclined from the level of the loading platform to the street level to thus facilitate the transporting of the passengers from the street to the conveyor platform without the use of stairs, run-ways and the like.

The operation of the herein described apparatus will no doubt be readily apparent to those skilled in this particular art without any further description of the same. The improvements involved herein over certain parts of the construction shown and described in my copending application previously referred to will also be readily apparent. Those details of construction which have only been briefly referred to herein or to which reference has been omitted entirely will preferably be similar to those described in detail in my said copending application. It will be apparent, however, that many features of the herein described invention are not limited in use to a construction involving all of the details of my copending application and as a consequence reservation is made to make such changes in the essential and all of the non-essential details of the invention as may come within the purview of the accompanying claims.

What I claim as my invention is:

1. In a transportation system, a platform comprising a plurality of endless belt-like elements arranged in substantial longitudinal alignment and spaced drums engaged respectively by the adjacent ends of successive elements said drums being of different diameters whereby the speed of successive elements differ.

2. In a transportation system, a loading platform comprising a plurality of endless belt-like elements arranged in substantial longitudinal alignment and pairs of differential diameter drums for each element with each drum engaged respectively by the adjacent ends of successive elements.

3. In a transportation system, a loading platform comprising a plurality of endless belt-like elements arranged in substantial longitudinal alignment and pairs of drums each of which is stepped to provide portions of different diameters, said elements extending from one diameter of one drum to a different diameter on the other, each drum being engaged respectively by the adjacent ends of successive elements.

4. In a transportation device, a movable platform, a gate, a pinion on said gate, a rack lever carried by said platform and engaging said pinion, a cam groove and a projection on said lever working in said groove whereby said lever may be oscillated.

5. In a transportation mechanism, a movable platform, a gate associated with the platform and having a lever, and a guiding device constantly engaging the lever to hold the gate in a predetermined position, said guiding device being provided with offset portions at spaced points defining cam surfaces for rocking the lever to open and close the gate.

6. In a transportation mechanism a movable platform, a gate associated with the platform and having a lever, and a guiding device having a groove engaged by a portion of said lever, said groove being provided at spaced points with offset portions defining cam surfaces for rocking the lever to open and close the gate.

7. In a transportation mechanism, a movable platform, a gate associated with the platform and having a lever, and a stationary guiding device having a groove engaged by a portion of said lever, said groove being provided at spaced points with offset portions defining cam surfaces for rocking the lever to open and close the gate.

In testimony whereof I affix my signature.

HERMAN E. TAYLOR.